(No Model.)

J. O'KEEFFE.
CARRYING APPARATUS.

No. 412,976. Patented Oct. 15, 1889.

WITNESSES:

INVENTOR:
J. O'Keeffe
BY Munn & Co
ATTORNEYS.

UNITED STATES PATENT OFFICE.

JOHN O'KEEFFE, OF OMAHA, NEBRASKA.

CARRYING APPARATUS.

SPECIFICATION forming part of Letters Patent No. 412,976, dated October 15, 1889.

Application filed June 15, 1889. Serial No. 314,364. (No model.)

*To all whom it may concern:*

Be it known that I, JOHN O'KEEFFE, of Omaha, in the county of Douglas and State of Nebraska, have invented a new and Improved Meat-Carrying Apparatus, of which the following is a full, clear, and exact description.

This invention relates to a novel form of track for the support of meat-carrying trucks; and to the end named it consists, essentially, of a double track or way and arched hanger-ties, by means of which the track-rails are held to place and in alignment, the track being designed for use in connection with a truck that is provided with a detachable meat-supporting hook, all as will be hereinafter fully explained, and specifically pointed out in the claims.

Reference is to be had to the accompanying drawings, forming a part of this specification, in which similar figures and letters of reference indicate corresponding parts in all the views.

Figure 2:
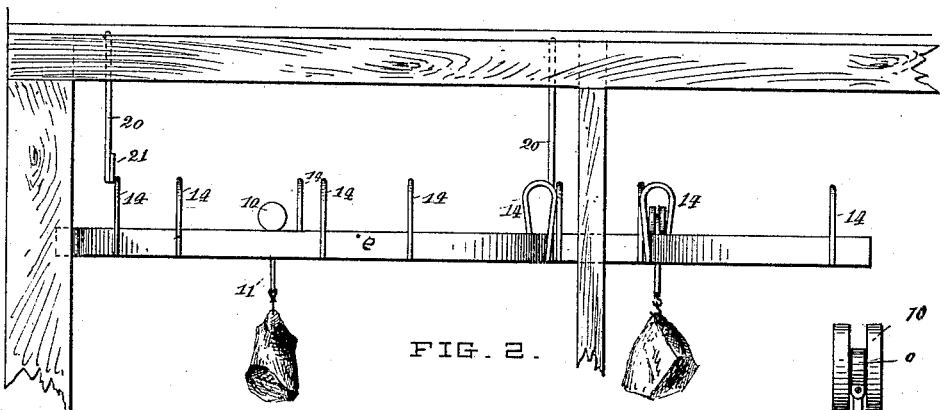
Figure 3:
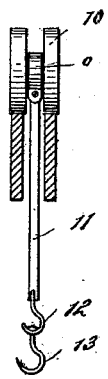
Figures 1, 4:
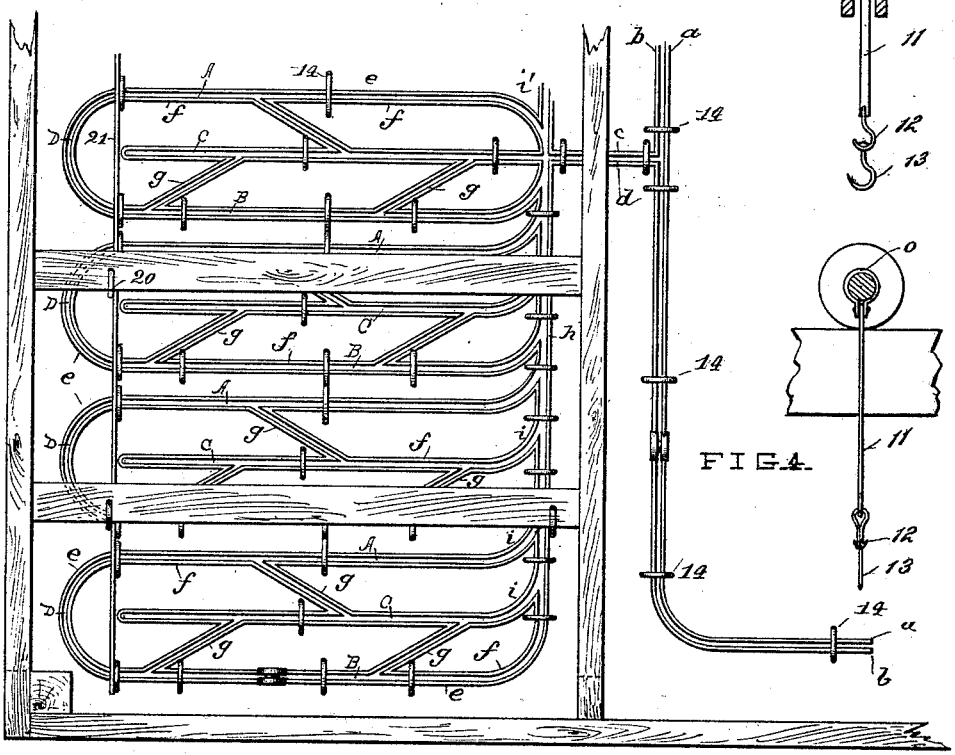

Figure 1 is a plan view of a portion of a track system embodying my invention. Fig. 2 is a side view thereof. Fig. 3 is an edge view of the truck, the track in this case being shown in section; and Fig. 4 is a central sectional elevation of the truck.

In the drawings, 10 represents a truck or carrier, which consists, essentially, of two wheels mounted upon a common shaft, or of two wheels that are connected by an integral central shaft, as represented in the drawings. Upon the shaft I loosely arrange a yoke $o$, to which there is connected a rod 11, that is apertured to receive a swivel-hook 12, said swivel-hook serving as the support for a meat-hook 13. The track or way upon which the truck above described is intended to ride is formed of rails $a$ and $b$, that are united by arched hanger-ties 14, the arms of such hanger-ties being secured to the outer faces of the track in a manner such that the truck is free to pass between the arches. The rails $a$ and $b$ form the receiving and distributing track, which is connected with the storage-tracks by rails $c$ and $d$, said storage-tracks being made up of sections formed of outer rails $e$ and inner rails $f$, the inner rails being separated to form auxiliary tracks, as represented, that are connected by permanent switchways $g$. All of the sections formed by the storage-tracks are reached by a track $h$, the switches connecting the storage-sections and the track or way $h$ being curved, as represented at $i$, an opposite curve $i'$ being given to these switches upon the opposite side of the entrance tracks made up by the rails $c$ $d$. The storage-tracks are formed in groups of three sets of tracks A B C, of which the outer tracks are connected at their inner ends, as at D, to form a continuous track, and the said outer tracks A B of each set communicate at their opposite ends with the track $h$, which runs at right angles to the storage-tracks. The central track C of each set or group of tracks A B C lies parallel with and intermediate of the tracks A B, and communicates therewith along its sides by means of lateral switch-tracks $g$, while at its outer end it communicates, as at $i$, with the track $h$. Each of the tracks and switches is composed of two parallel flat rails placed vertically edgewise, and all of the rails are rigidly connected together. The upper faces of all of the rails may thus lie in the same plane, so that the truck-wheels, which are flangeless, may be readily turned to pass from track to track. The rod 11, being between the track-rails, prevents the wheels from leaving said rails.

In the drawings I have shown only a few suspending-rods 20, said rods being secured to a longitudinal bar 21, or to the arches 14; but in practice I desire to be understood that any number of these suspending-rods could be employed.

From the construction described it will be seen that meat or other articles suspended, as represented in Fig. 2, may be moved to such position upon the storage-sections as may be desired, and it will also be seen that most any piece so stored may be run out upon the receiving and delivery tracks without interfering with the position of the other pieces.

Having thus described my invention, I claim as new and desire to secure by Letters Patent—

1. In a meat-carrying apparatus, a set of parallel storage-tracks A B C, and a track $h$, with which the outer ends of all of said tracks communicate, as at $i$, stationary switch-tracks $g$, rigidly connecting the inner rails of the tracks A B with the rails of the intermediate track, substantially as set forth.

2. In a meat-carrying apparatus, the set or group of double-rail tracks A B C, communicating at their ends, as at $i$, with a track $h$, the opposite ends of the tracks A B being connected to form a continuous track, and the double-rail switch-tracks $g$ between the rails of the inner track C and the inner rails of the outer tracks A B, substantially as set forth.

3. A meat-carrying apparatus consisting in the receiving and distributing track consisting in the parallel rails $a\ b$, the track $h$, the rails $c\ d$, connecting said tracks, and the series of storage-tracks, each comprising a set or group of double-rail tracks A B C, the rails of tracks A B being connected at their inner ends by a curved section and at their opposite ends communicating with the track $h$, as at $i$, and the central tracks of each group having switch-tracks $g$ connecting with the rails of tracks A B, and communicating at their outer ends with the track $h$, the hangers suspending said tracks from the outer sides of their rails, and the carriers having flangeless wheels and rods 11, passed between the rails, the switch and other rails being rigidly connected, substantially as set forth.

JOHN O'KEEFFE.

Witnesses:
C. S. McMonies,
P. T. McGrath.